Patented Mar. 5, 1935

1,993,345

UNITED STATES PATENT OFFICE 1,993,345

PROCESS OF REVIVIFYING ADSORBENTS

Charles L. Jones, Pelham, N. Y., assignor, by mesne assignments, to Adico Development Corporation No Drawing. Application July 14, 1933, Serial No. 680,458

3 Claims. (Cl. 252—2)

This invention relates to the revivifying of adsorbents employed in purifying gases and, more particularly, to revivifying solid adsorbent material, such as activated carbons, employed in purifying carbon dioxide gas.

The object of my invention is to provide a process by means of which the adsorbents used in such purification may be more quickly and thoroughly revivified and restored to service than heretofore, thus making the operation more expeditious, and reducing the number and size of adsorbent traps necessary to do a given job, thus reducing the cost of the installation.

In what follows I shall refer only to adsorbent carbon, although it will be understood that other solid adsorbents, such as activated alumina, silica gel, or other materials requiring revivification by heat and/or steam, and periodical subsequent cooling, may be substituted.

It has heretofore been customary in using activated carbon for the purification of carbon dioxide to revivify it either with saturated or superheated steam, and the period during which steam is passed through carbon beds in commercial practice is always a matter of at least several hours, usually 8 hours or more, and sometimes as much as a day.

This step has been followed by a purging of the carbon, usually by blowing through it purified carbon dioxide gas, in order to remove any traces of odor still remaining in the pores and on the surfaces of the carbon, and also to sweep out any residual moisture. This period, too, usually occupies several hours or more.

This step is followed in commercial practice by the cooling of the adsorbent material during an additional period before it is again ready to be placed in the purification train and recommence its work of purifying the commercial carbon dioxide gases passed through it.

In this final step of cooling, the speed at which the carbon is cooled depends upon the size and shape of the body of charcoal in the trap employed in a particular instance, and the size and arrangement of the cooling pipes, if any, which are buried in the bed of charcoal. This cooling operation ordinarily requires from eight hours to as much as thirty-six hours, eight hours being about a minimum in commercial work, even where cold water in ample quantities is available and water cooling pipes are generously distributed throughout the bed of charcoal, so that no part of the carbon bed is more than, say, two inches from the nearest cooling pipe surface. This is because of the well-known thermal insulating properties of such carbons, which retard the transmission of heat through the bed.

In some instances the carbon is cooled by passing cold gases through it, but, owing to the limited heat capacity of carbon dioxide and the great heat of adsorption which is evolved when the gas is first brought in contact with the same adsorbent, this is also a slow process.

In a typical example of a commercial installation, approximately 2,000 pounds of adsorbent carbon are packed in a shell approximately three feet in diameter by ten feet in length. With such a shell purification would continue for a period ranging from thirty to forty hours, following which twenty-four hours is required for revivification, including eight hours for heating with steam, eight hours for purging and drying, and eight hours for cooling by means of cold water circulated through pipes embedded in charcoal. In this example, the useful operation of the trap occupies only thirty-six hours out of sixty, or 60% of the time, the other 40% being required for revivification.

It will be readily seen that if the time required for revivification can be reduced to nine hours without sacrifice of activity in the carbon, the total cycle would become forty-five hours instead of sixty, and the useful operation would occupy 80% instead of 60% of the total time. In this case the amount of carbon required to do the same job would be decreased by 20%, permitting a substantial saving in the first cost of the carbon required, which in commercial carbon dioxide plants runs into many thousands of dollars.

I accomplish this reduction of revivification time by employing superheated steam for the heating of the carbon and the driving out of impurities, and then very suddenly chilling the carbon throughout the bed by totally or partially flooding the adsorbent with very cold liquid carbon dioxide. In practicing the process it is only necessary that the shell in which the carbon is packed be of adequate strength to safely sustain the maximum carbon dioxide pressure to which it is subjected. This may, if desired, be any pressure up to 1,000 pounds per square inch, and it is, of course, well known that the temperature of the liquid carbon dioxide flooded through the bed of carbon would correspond to the pressure existing in the shell. For reasons of economy, in construction it is desirable to build the shell for a rather low pressure, and such low pressure is further desirable because of the lower resulting temperature of the liquid carbon dioxide and the more rapid cooling obtainable thereby. Thus, as an example, the tank would be constructed for an operating pressure between the triple point of carbon dioxide, which is approximately 75 pounds absolute, or 60 pounds gage pressure, and 100 pounds gage pressure. A suitable spray nozzle or perforated manifold should preferably be employed for introducing the liquid $CO_2$ in the top of the shell and spraying it over the bed of carbon, permitting it to run down through the bed and refrigerate it by direct contact. A suitable valve for the relief of the gases produced when the liquid $CO_2$ boils because of the evolution of heat, must be provided, and this is preferably piped back to the manufacturing system so that the carbon dioxide used need not be wasted.

I have found that the utilization of the process of my invention enables a reduction of the time required for revivification an amount at least equal to, and in most instances greater than, that hereinbefore given.

While I have described my process as applied to revivifying an adsorbent material for purifying carbon dioxide gas, it will be readily understood that the process may be employed for revivifying any solid adsorbent material which employs heat and/or steam and periodical subsequent cooling for its revivification.

Having now set forth the objects and nature of my invention, what I claim as new and useful and of my own invention and desire to secure by Letters Patent is:

1. The process of revivifying an adsorbent which comprises heating the adsorbent to drive off the impurities therefrom, and then rapidly cooling the adsorbent by direct contact with boiling liquefied carbon dioxide at pressures greater than 75 pounds per square inch.

2. The process of revivifying an adsorbent which comprises subjecting the adsorbent material to superheated steam to drive off the impurities therefrom, and then rapidly cooling the adsorbent by direct contact with boiling liquefied carbon dioxide at pressures greater than 75 pounds per square inch.

3. The process of revivifying activated carbon which comprises subjecting the carbon to superheated steam to drive off the impurities thereof, and then rapidly cooling the carbon by direct contact with boiling liquid carbon dioxide at pressures greater than 75 pounds per square inch.

CHARLES L. JONES.